United States Patent
Han

(10) Patent No.: US 9,353,705 B2
(45) Date of Patent: May 31, 2016

(54) COOLER SYSTEM FOR VEHICLE

(71) Applicant: Hyundai Motor Company, Seoul (KR)

(72) Inventor: Jungjae Han, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 820 days.

(21) Appl. No.: 13/678,429

(22) Filed: Nov. 15, 2012

(65) Prior Publication Data

US 2014/0041643 A1 Feb. 13, 2014

(30) Foreign Application Priority Data

Aug. 10, 2012 (KR) ........................ 10-2012-0087685

(51) Int. Cl.
| | | |
|---|---|---|
| *F02M 25/07* | (2006.01) | |
| *F02B 47/08* | (2006.01) | |
| *F01P 3/20* | (2006.01) | |
| *F01M 5/00* | (2006.01) | |

(52) U.S. Cl.
CPC ............... *F02M 25/07* (2013.01); *F01M 5/00* (2013.01); *F01P 3/20* (2013.01); *F02B 47/08* (2013.01); *F02M 25/0728* (2013.01); *F02M 25/0731* (2013.01); *F02M 25/0738* (2013.01); *F01P 2060/04* (2013.01); *F01P 2060/16* (2013.01); *Y02T 10/121* (2013.01)

(58) Field of Classification Search
CPC .............. F02M 25/07; F02M 25/0728; F02M 25/0731; F02M 25/073; F02M 25/0727; F02M 25/0703; F01M 5/00; F01P 3/20; F01P 2060/16; F01P 2060/04; F02B 47/08; Y02T 10/121

See application file for complete search history.

(56) References Cited

U.S. PATENT DOCUMENTS

| 4,391,235 A * | 7/1983 | Majkrzak ............... 123/142.5 R |
|---|---|---|
| 4,685,430 A * | 8/1987 | Ap ........................ 123/142.5 R |
| 6,062,304 A * | 5/2000 | Kremer et al. ................ 165/140 |
| 6,360,702 B1 * | 3/2002 | Osada ........................ 123/41.31 |
| 6,807,955 B2 * | 10/2004 | Leedham et al. ........ 123/568.12 |
| 8,205,443 B2 * | 6/2012 | Pegg et al. ....................... 60/320 |
| 8,794,299 B2 * | 8/2014 | Barfknecht et al. ............ 165/41 |
| 2008/0264609 A1 * | 10/2008 | Lutz et al. ................ 165/104.19 |
| 2009/0090492 A1 * | 4/2009 | Ablitzer et al. ............... 165/138 |
| 2011/0000188 A1 | 1/2011 | Pegg et al. |
| 2012/0067545 A1 * | 3/2012 | Yamazaki et al. .............. 165/52 |

FOREIGN PATENT DOCUMENTS

| JP | 2000-45770 A | 2/2000 |
|---|---|---|
| JP | 2001-280130 A | 10/2001 |
| JP | 2001-303953 A | 10/2001 |

(Continued)

*Primary Examiner* — Hieu T Vo
*Assistant Examiner* — Sherman Manley
(74) *Attorney, Agent, or Firm* — Morgan, Lewis & Bockius LLP

(57) ABSTRACT

An integrated cooler system for a vehicle includes an Exhaust Gas Recirculation cooler, an oiler cooler, a cooling water line configured to selectively transfer the cooling water directly to the oil cooler without through the EGR cooler or to the oil cooler by way of the EGR cooler depending on the warm up state of the engine, and an oil line configured to selectively transfer the oil supplied from an oil pump to the oil cooler without passing through the EGR cooler or to an oil filter after passing through the EGR cooler depending on the warm up state of the engine, the oil filter serving to filter impurities contained in the oil from the oil cooler.

11 Claims, 6 Drawing Sheets

(56) References Cited

FOREIGN PATENT DOCUMENTS

| JP | 2005-299592 A | 10/2005 |
| JP | 2007-239719 A | 9/2007 |
| JP | 2009-74391 A | 4/2009 |
| JP | 2010-209742 A | 9/2010 |
| KR | 10-2002-0037832 A | 5/2002 |
| KR | 10-2007-0005828 A | 1/2007 |
| KR | 10-2008-0027683 A | 3/2008 |

* cited by examiner

FIG.2

| | T_Oil | T_CW | ECB | Sol1 | Sol2 |
|---|---|---|---|---|---|
| | | A | 4 | 13 | 23 |
| a | Low | Low | Open | Open | Close |
| b | M | M | Close | Open | Open |
| c | H (>90°C) | H | Close | Close | Close |

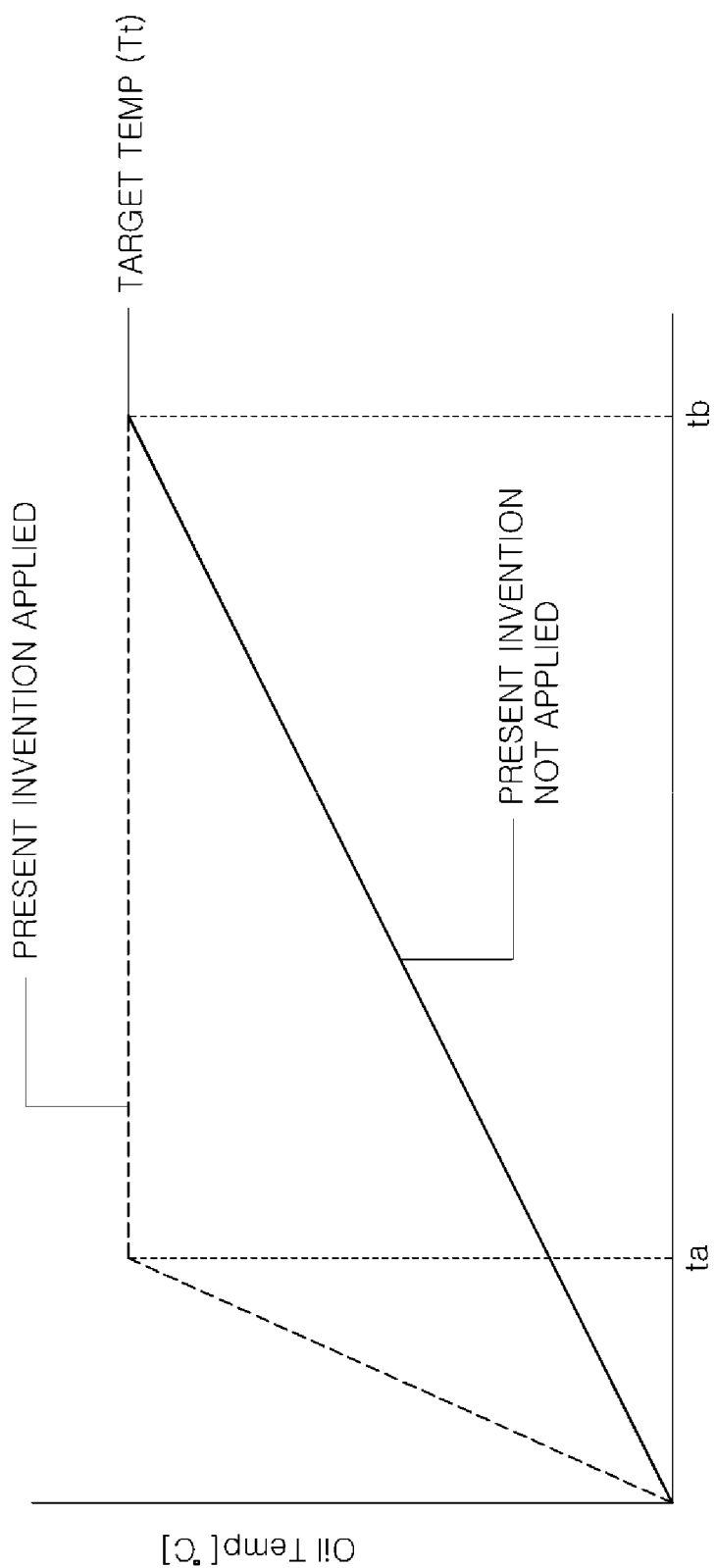

COOLER SYSTEM FOR VEHICLE

CROSS-REFERENCE(S) TO RELATED APPLICATIONS

The present application claims priority of Korean Patent Application Number 10-2012-0087685, filed on Aug. 10, 2012, the entire contents of which application is incorporated herein for all purposes by this reference.

BACKGROUND OF INVENTION

1. Field of Invention

The present invention relates to an oil cooler and an EGR (Exhaust Gas Recirculation) cooler for a vehicle, and particularly to an integrated cooler system for a vehicle which makes it possible to greatly reduce the time needed to reach the warm up of oil by facilitating the oil to have a heat exchange with the EGR gas at the time of a cold start, while ensuring that a driving force loss of a water pump can be reduced in such a way to minimize the differential pressure of cooling water of an EGR cooler circuit.

2. Description of Related Art

The EGR gas, which generally uses an exhaust gas, should be carefully handled to minimize generation of $NO_x$ due to a high temperature, whereas the engine oil, which is generally used to lubricate an oil pump and a friction portion between a cylinder block and a piston and a crank shaft and other engine elements, should be carefully managed so the engine oil will not be at a low temperature having a high kinematic viscosity. Here, EGR represents Exhaust Gas Recirculation.

For this, the EGR gas circulates along an EGR cooler configured to perform a heat exchange operation with cooling water (or anti-freezing solution), thus preventing a high temperature state which might causes $NO_x$ to generate.

In addition, since the engine oil circulates along an oil cooler configured to perform a heat exchange operation with cooling water, thus preventing a low temperature state which might lower friction force. In particular, because the engine oil is heated by cooling water, the oil temperature can quickly warm up in a cold state when a vehicle drives, so the friction force can be reduced at the lubricating parts of an engine, thus enhancing the fuel efficiency of a vehicle.

The source of heat to increase the temperature of cooling water is a combustion (including EGR gas) energy generated at the engine, and the engine heat generated from combustion is needed to be more efficiently used. Examples of utilizing the engine heat include a heat storage (HE) technology directed to storing residual heat and supplying heat at the time of cold operation, and an exhaust heat recirculation system (EHRS) directed to enhancing a warm up characteristic by re-circulating exhaust gas waste heat which used to be wasted. Both the HE (Heat Storage) technology and the EHRS (Exhaust Heat Recirculation System) technology are directed to quickly increasing the temperature of cooling water or oil, thereby enhancing the combustion efficiency and improving fuel efficiency.

When a cooler system is formed of an EGR cooler, an oil cooler and cooling water, the EGR gas line is configured to directly pass through the EGR cooler or is configured to have a layout with a bypass; however the cooling water line is configured to have a layout passing through the EGR cooler all the time.

The above mentioned constructions are provided since the engine oil has to absorb heat from high temperature cooling water (anti-freezing solution) so that it does not have a high kinematic viscosity, whereas the EGR gas has to emit heat to low temperature cooling water (anti-freezing solution) so that the temperature can be lowered.

The above mentioned cooler system needs inevitably an indirect heat exchange operation between an EGR cooler and an oil cooler with cooling water being used as a medium. Such a system takes long time to increase the oil temperature during a cold operation, causing a discharge pressure of an oil pump to increase.

As an example, the increase of the discharge pressure of the oil pump results in an increase of the oil pressure, and the increase of the oil pressures results in an increase of a jointing pressure in the engine friction system, so the friction force of the engine driving system is lowered. In particular, the low temperature oil has a high kinematic viscosity and a high oil pressure, thereby lowering the wear resistances of the engine elements and generating noises. As a result, the durability of the engine might be greatly lowered.

So, the layout for a cooling water circulation in the EGR cooler and the oil cooler is important for the temperature control of gas such as EGR gas and fluid such as engine oil by way of a heat exchange (heating and cooling).

Since the cooling water line has a layout passing through the EGR cooler all the time, any disadvantages occurring in an independent cooler system formed of an oil cooler and an EGR cooler cannot be overcome. Also, since it takes long time to increase oil temperature during a cold operation, the discharge pressure of an oil pump increases, and the oil pressure increases due to the increase of the discharge pressure of the oil pump. As such, the jointing pressure in the engine friction system increases, and the friction force in the engine driving system increases. Further, the low temperature oil has a high kinematic viscosity and a high oil pressure, thereby lowering the wear resistances of the engine elements and generating noises. As a result, the durability of the engine might be greatly worsened.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a cooler system for a vehicle which features in that cooling water and oil selectively exchange heat with EGR gas heat depending on the driving or warming up state of an engine, and in particular the time needed to warm up an oil is greatly reduced with the aid of a heat exchange operation using cooling water heated by the heat from the engine at the time of a cold start, so the lubrication conditions in the driving system can be maintained in the optimized state. Since the differential pressure of the cooling water can be minimized with the aid of the heat exchange with the EGR gas at the time of the cold start, the pressure loss of the water pump can be prevented.

Various aspects of the present invention provide a cooler system for a vehicle including an Exhaust Gas Recirculation (EGR) cooler configured to selectively discharge an EGR gas through or not through an interior of the EGR cooler to an outside depending on a warm up state of an engine, wherein the EGR gas, when discharged through the interior of the EGR cooler, serving to transfer heat to selectively cooling water or oil depending on a warm up state of an engine; an oil cooler configured to flow oil, the oil serving to absorb heat from the cooling water which is discharged to the outside after it transfers heat to the oil; a cooling water line configured to selectively transfer the cooling water directly to the oil cooler without through the EGR cooler or to the oil cooler by way of the EGR cooler depending on the warm up state of the engine; and an oil line configured to selectively transfer the oil supplied from an oil pump to the oil cooler without passing through the EGR cooler or to an oil filter after passing through the EGR cooler depending on the warm up state of the engine, the oil filter serving to filter impurities contained in the oil from the oil cooler.

The warm up state of the engine may be divided into an initial engine cold operation state, an engine warm up state and an engine full warm up state. The cooling water line may be configured to directly transfer the cooling water to the oil cooler without passing through the EGR cooler in the initial engine cold operation state and the engine warm up state, and to the oil cooler through the EGR cooler in the engine full warm up state. The oil line may be configured to directly transfer the oil to the oil cooler without passing through the EGR cooler in the initial engine cold operation state and the engine full warm up state, and to the oil filter after passing through the EGR cooler in the engine warm up state.

The EGR cooler may include a cooling water circulation line in which the cooling water circulates while absorbing heat from the EGR gas, an oil circulation line in which the oil circulates while absorbing heat from the EGR gas, and an exhaust control valve (ECV) configured to selectively allow the EGR gas circulating the interior of the EGR cooler or discharging directly to the outside without circulating the interior of the EGR cooler.

The cooling water circulation line and the oil circulation line each may include a plurality of pipe lines connected with inlet ports and outlet ports and the ECV may include an on/off valve.

The cooling water line may include a cooling water inlet pipe connected with the EGR cooler, a cooling water branch pipe which is divided from the cooling water inlet pipe and provides a direct connection to the oil cooler, a cooling water valve installed at an divided portion of the cooling water inlet pipe, a cooling water connection pipe serving to transfer the cooling water from the EGR cooler to the cooling water branch pipe, and a cooling water discharge pipe for discharging the cooling water circulated in the oil cooler to the outside.

The cooling water valve may include a solenoid valve or an on/off valve.

The oil line may include an oil inlet pipe connected with the oil cooler, an oil branch pipe divided from the oil inlet pipe and providing a connection to the EGR cooler, an oil valve installed at an divided portion of the oil inlet pipe, and an oil connection pipe serving to transfer the oil from the EGR cooler to the oil discharge pipe.

The oil valve may include a solenoid valve or an on/off valve.

Other aspects of the present invention provide a cooler system for a vehicle including an EGR cooler, an oil cooler, a cooling water line and an oil line. The EGR cooler may include a cooling water circulation line in which the cooling water circulates while absorbing heat from the EGR gas, an oil circulation line in which the oil circulates while absorbing heat from the EGR gas, and an ECV configured to selectively allow the EGR gas circulating the interior of the EGR cooler or discharging directly to the outside without circulating the interior of the EGR cooler. The oil cooler may be configured to flow oil, the oil serving to absorb heat from the cooling water which is discharged to the outside after it transfers heat to the oil. The cooling water line may include includes a cooling water inlet pipe connected with the EGR cooler, a cooling water branch pipe which is divided from the cooling water inlet pipe and provides a direct connection to the oil cooler, a cooling water valve installed at an divided portion of the cooling water inlet pipe for forming a direct connection to the oil cooler, a cooling water connection pipe serving to transfer the cooling water from the EGR cooler to the cooling water branch pipe, and a cooling water discharge pipe for discharging the cooling water circulated in the oil cooler to the outside. The oil line may include an oil inlet pipe connected with the oil cooler, an oil branch pipe divided from the oil inlet pipe and providing a connection to the EGR cooler, an oil valve installed at an divided portion of the oil inlet pipe, and an oil connection pipe serving to transfer the oil from the EGR cooler to the oil discharge pipe.

The warm up state of the engine may be divided into an initial engine cold operation state, an engine warm up state and an engine full warm up state. The ECV may be configured to directly transfer the EGR gas to the outside without the circulation in the interior of the EGR cooler in the initial engine cold operation state as it is switched to the open, whereas the EGR gas is discharged to the outside after it circulates in the interior in the engine warm up state and the engine full warm up state as it is switched to the close. The cooling water valve may be configured to directly transfer the cooling water to the oil cooler without passing through the EGR cooler in the initial engine cold operation state and the engine warm up state as it is switched to the open, whereas the cooling water is transferred to the oil cooler after it passes through the EGR cooler in the engine full warm up state as it is switched to the close. The oil valve may be configured to directly transfer the oil to the oil cooler without passing through the EGR cooler in the initial engine cold operation state and the engine full warm up state as it is switched to the close, whereas the oil is transferred to the oil filter after it passes through the EGR cooler in the engine warm up state as it is switched to the open.

The ECV may include an on/off valve, and the cooling water valve and the oil valve may include solenoid valves or on/off valves.

In the various embodiments of present invention, the cooling water and the oil are heat-exchanged with the EGR gas depending on the driving state of the engine, and in particular the oil involves in the heat exchange operation with the EGR gas at the time of the cold start, so the time needed to reach the warm up is greatly reduced, and the well optimized state can be obtained in the driving system since there are not any problems in the friction force transfer which used to occur due to a high kinematic viscosity when the oil is a low temperature.

In addition, the present invention features in that since the lubrication state can be maintained in the optimized state in the driving system even at the time of the cold start, the wear resistance is enhanced, the fatigue strength is increased, and the durability is greatly enhanced. In particular, since the lubrication state of the engine quickly reaches the optimized state, the noises and vibrations are reduced dramatically.

Since the cooling water and the oil exchange heat with the EGR gas depending on the driving state of the engine, the differential pressure can be minimized by way of the EGR cooler at the time of the cold start, so the loss of the driving force of the water pump and the total heat of the oil cooler and the EGR cooler can be improved significantly. The fouling phenomenon of the ER cooler can be improved significantly as well.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation condition table on a plurality of valves provided in an exemplary integrated cooling system for a vehicle according to the present invention.

FIG. 6 is an oil temperature diagram of an exemplary integrated coolers system for a vehicle according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
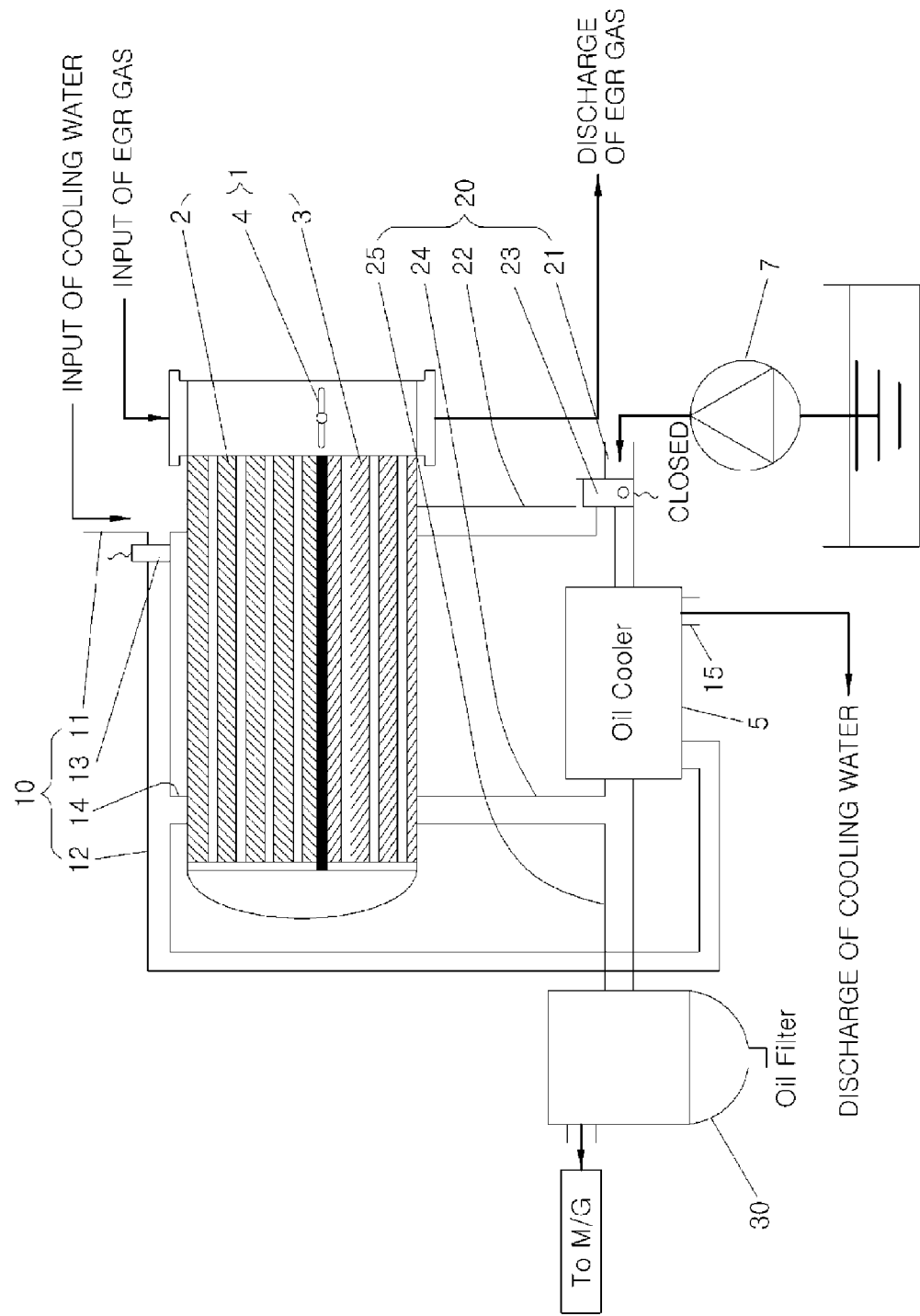
FIG. 1 is a view illustrating an exemplary integrated cooling system for a vehicle according to the present invention.

FIG. 1 is a view illustrating an exemplary integrated cooler system for a vehicle according to various embodiments of the present invention. As shown therein, the cooler system includes an EGR cooler 1 in which an EGR gas flows, the EGR gas lowering the temperature as it transfers heat to cooling water and oil, an oil cooler 5 in which oil flows, the oil increasing the temperatures as it absorbs heat from the cooling water, a cooling water line 10 receiving the cooling water from the cooling system of the engine and circulating it to the EGR cooler 1 and the oil cooler 5 depending on the driving state of the engine, and an oil line 20 configured to circulate the oil received from the oil pump 7 to the EGR cooler 1 and the oil cooler 5 depending on the driving state of the engine.

The EGR cooler 1 includes a cooling water circulation line 2 configured to circulate the cooling water so that the induced cooling water can be discharged after it absorbs the heat from the EGR gas and has an increased temperature, an oil circulation line 3 configured to circulate the oil so that the induced oil can be discharged after it absorbs the heat from the EGR gas and has an increased temperature, and an exhaust control valve (ECV) 4 which facilitates the EGR gas supplied from the exhaust gas from the engine after the combustion to be discharged after it has an inner circulation in the EGR cooler 1 or it is discharged without having an inner circulation in the EGR cooler 1.

The cooling water circulation line 2 is formed of a plurality of arranged pipes so that the cooling water can circulate, in multiple stages, in the interior of the EGR cooler 1, and the oil circulation line 3 is formed of a plurality of arranged pipes so that the oil can circulate, in multiple stages, in the interior of the EGR cooler 1. The cooling water circulation line 2 and the oil circulation line 3 are generally arranged in a shape of a straight line; however they can be arranged in a zigzag shape or other shapes if necessary.

The ECV 4 is an on/off valve which opens and closes in response to a control of the controller (generally, ECU). The coil cooler 5 is configured to have a layout which features in that the oil is inputted from the oil pump 7, and the oil is discharged to an oil filter 30 which serves to filter the impurities contained in the oil supplied to the engine.

The cooling water line 10 includes a cooling water inlet pipe 11 connected with an EGR cooler 1 for the purpose of transferring cooling water to the EGR cooler 1, a cooling water branch pipe 12 which is divided from the cooling water inlet pipe 11 for the purpose of transferring the cooling water, which does not pass through the EGR cooler 1, to the oil cooler 5, and is connected with the oil cooler 5, a cooling water valve 13 installed at the divided portion of the cooling water inlet pipe 11, a cooling water connection pipe 14 which is connected from the EGR cooler 1 to the cooling water branch pipe 12 so that the cooling water, which passes through the EGR cooler 1, can be transferred to the oil cooler 5, and a cooling water discharge pipe 15 which is configured to discharge the cooling water, which passes through the oil cooler 5, to the outside.

The cooling water inlet pipe 11 is connected to an inlet port of the cooling water circulation line 2 of the EGR cooler 1, and the cooling water connection pipe 14 is connected to an outlet port o the cooling water circulation line 2 of the EGR cooler 1. The cooling water valve 13 is formed of a solenoid valve or an on/off valve which opens and closes in response to a control of the controller (generally, ECU).

The oil line 20 includes an oil inlet pipe 21 connected with the oil cooler 5 for the purpose of transferring oil to the oil cooler 5, an oil branch pipe 22 which is divided from the oil inlet pipe 21 for the purpose of transferring oil to the EGR cooler 1 and is connected with the EGR cooler 1, an oil valve 23 installed at the divided portion of the oil inlet pipe 21, and an oil connection pipe 24 which is connected so that the oil, which passes through the EGR cooler 1, can be transferred to the oil discharge pipe 25 connected from the oil cooler 5 to the oil filter 30.

The oil branch pipe 22 is connected to the inlet portion of the oil circulation line 3 of the EGR cooler 1, and the oil discharge pipe 24 is connected with the outlet portion of the oil circulation line 3 of the EGR cooler 1. The oil valve 23 is formed of a solenoid valve or an on/off value which opens or closes in response to a control of the controller (generally, ECU).

FIG. 2 is a view illustrating the operation conditions of the ECV 4 of the EGR cooler 1, the cooling water valve 13 of the cooling water line 1 and the oil valve 23 of the oil line 20. As shown therein, the temperature items A including the oil temperature T_Oil and the cooling water temperature T_CW are divided into a low temperature LOW(a), an intermediate temperature M(b) and a high temperature H(c), with which temperature states the warm up states of the engine can be checked. The temperature items A can set a temperature H(c), for example, higher than 90° C.

With the above mentioned operations, it can be recognized that the ECV 4, the cooling water valve 13 and the oil valve 23 can open or close depending on the temperatures of the cooling water and the oil. For example, at the temperature LOW (a), the ECV 4 and the cooling water valve 13 open whereas the oil valve 23 is closed, and at the temperature M(b), the ECV 4 is closed whereas the cooling water valve 13 and the oil valve 23 are open, and at the temperature H(c), the ECV 4, the cooling water valve 13 and the oil valve 23 are all closed.

Figure 3:
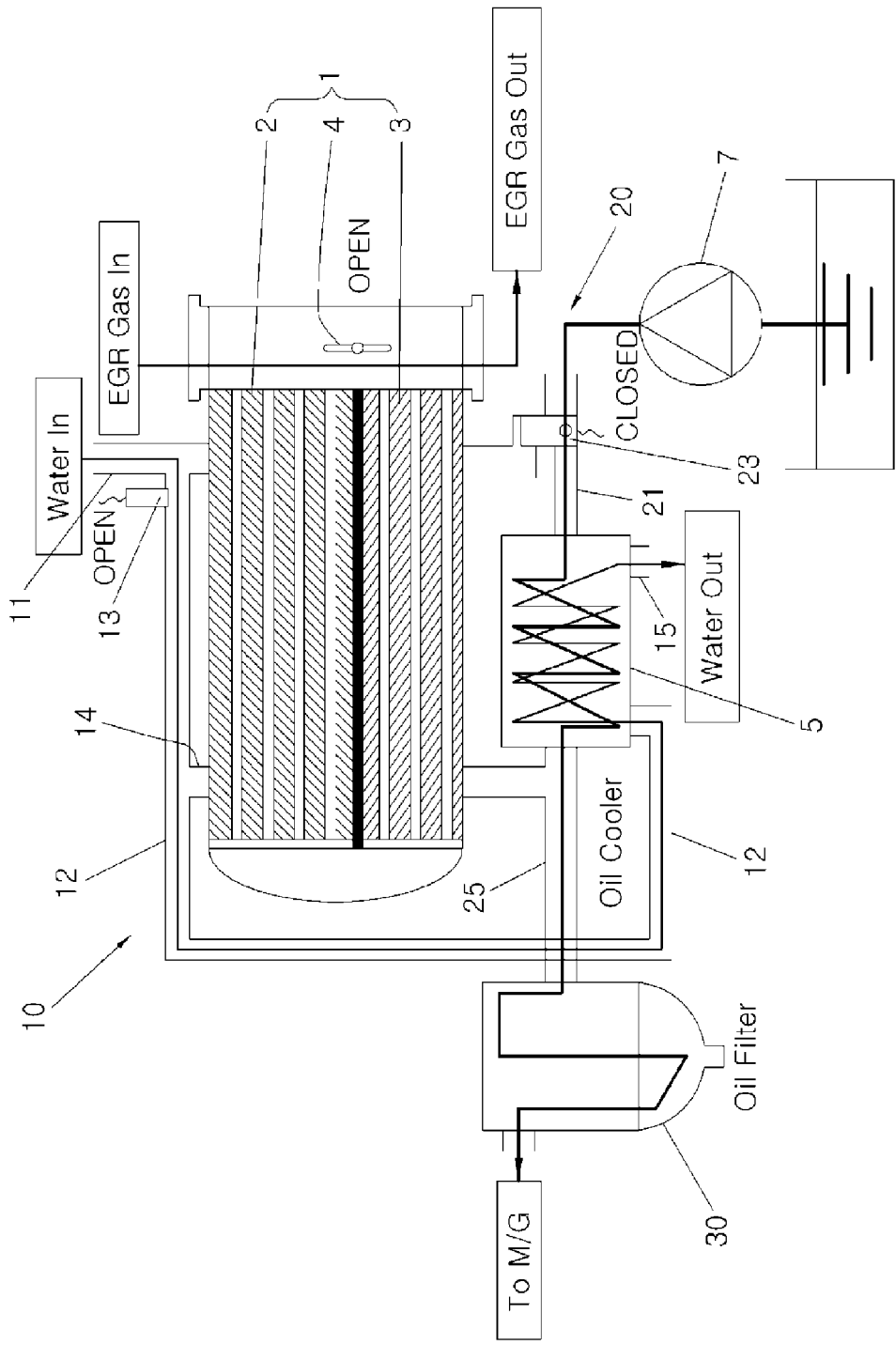
FIG. 3 is a view illustrating an initial cold start of an engine in an exemplary integrated cooling system for a vehicle according to the present invention.

FIG. 3 is a view illustrating an initial operation state of the engine in an exemplary integrated cooler system for a vehicle according to various embodiments of the present invention. As shown therein, as the ECV 4 is switched to the open, the EGR gas is directly discharged to the outside without circulating through the interior of the EGR cooler 1, and as the cooling water valve 13 is switched to the open, the cooling water supplied from the engine is straight supplied to the oil cooler 5 by way of the cooling water branch pipe 12, and as the oil valve 23 is switched to the close, the oil supplied from the oil pump 7 is straight supplied to the oil cooler 5 by way of the oil inlet pipe 21. The above mentioned operation corresponds to Low(a) in FIG. 2.

At the initial cold operation of the engine, the EGR cooler 1 bypasses the EGR gas, and the oil cooler 5 features in that the oil is directly supplied to the oil inlet pipe 21 of the oil line 20, and at the same time the cooling water is directly supplied to the cooling water branch pipe 12 of the cooling water line 10.

Even at the cold start of the engine, the time needed to reach the warm up of oil can be dramatically reduced with the aid of the heat exchange operation using the cooling water which is heated by the heat from the engine. The lubrication states in the driving system can be maintained in the optimized state without having any problems in terms of the friction force which used to occur owing to the high kinematic viscosity when the oil temperature is low, and in particular the fuel efficiency can be significantly enhanced.

In addition, since the cooling water heated by the heat from the engine does not involve in the heat exchange operation with the EGR gas, the loss of the driving force of the water pump can be reduced by minimizing the differential pressure of the cooling water, and the fouling phenomenon of the EGR cooler can be quite improved in such a way to prevent the over cooling of the EGR gas.

Figure 4:
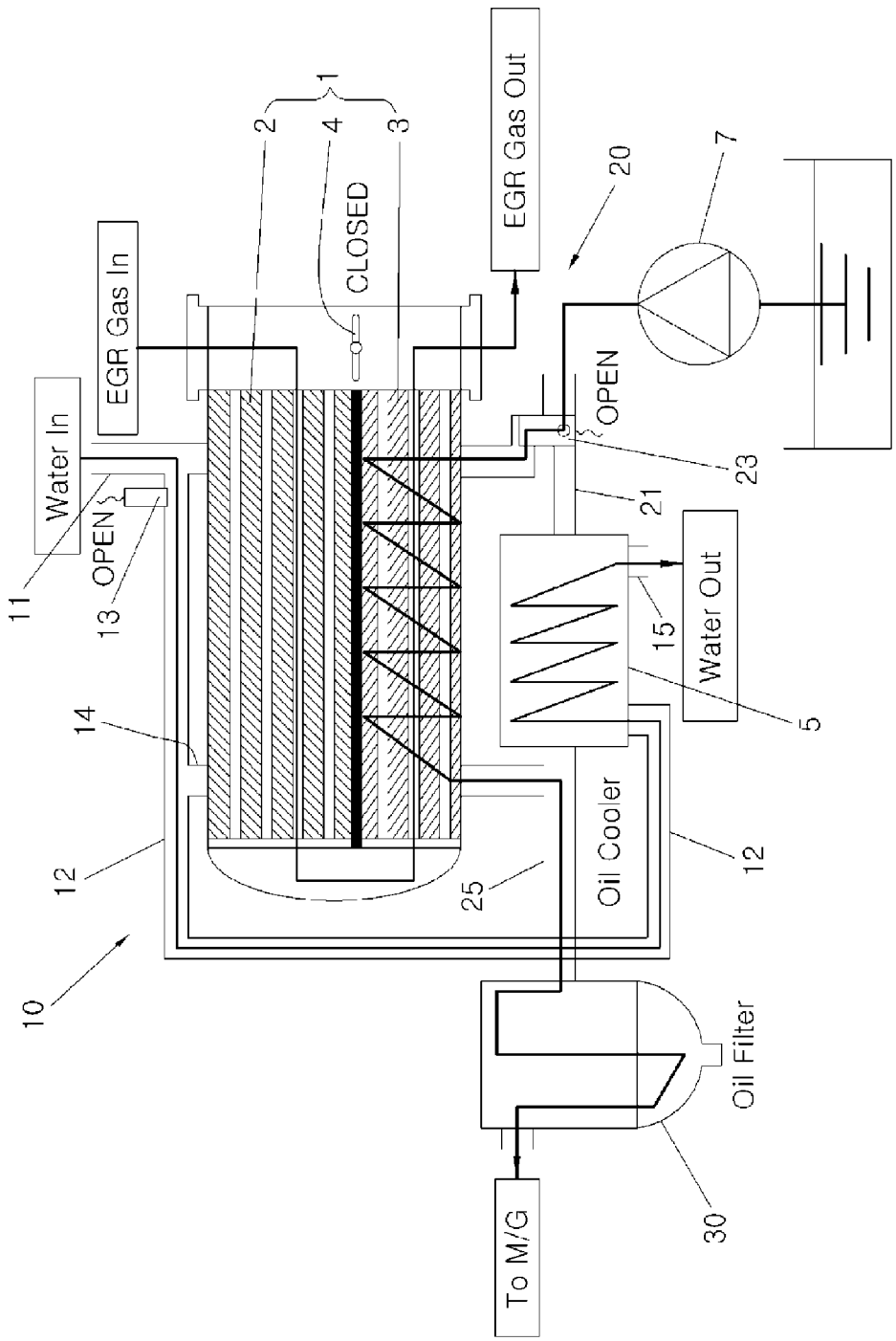
FIG. 4 is a view illustrating a warm up operation state of an exemplary integrated cooling system for a vehicle according to the present invention.

FIG. 4 is a view illustrating an operation state at the time needed to reach the warm up in an exemplary integrated cooler system for a vehicle according to various embodiments of the present invention. As shown therein, as the ECV 4 is switched to the close, the EGR gas circulates in the interior of the ER cooler 1 and is discharged to the outside, and as the cooling water valve 13 is switched to the open, the cooling water supplied from the engine is directly supplied to the oil cooler 5 by way of the cooling water branch pipe 12, and as the oil valve 23 is switched to the open, the oil supplied from the oil pump 7 is not supplied to the oil cooler 5, and instead it is supplied to the EGR cooler 1 by way of the oil branch pipe 22. The above mentioned operation corresponds to M(b) of FIG. 2.

In the engine warm up section, the EGR cooler 1 is configured to circulate the EGR gas in the interior, and the oil cooler 5 features in that the cooling water is directly supplied to the cooling water branch pipe 12 of the cooling water line 10 with the oil being not supplied.

The oil absorbs the heat from the EGR gas by way of the oil circulation line 3 of the EGR cooler 1 and has an increased temperature, and is supplied to the oil connection pipe 2 connected to the outlet portion and then is supplied to the oil filter 30 by way of the oil discharge pipe 25, not by way of the oil cooler 5.

With the above mentioned operations, the oil during the warm up time is not heated by means of the heat exchange operation using a high temperature EGR gas, and the EGR gas does not lose heat to the cooling water but instead transfers the heat only to the oil, so the time needed to warming up the oil can be dramatically reduced. The lubrication states in the driving system can be maintained in the optimized state without having any problems in terms of the friction force which used to occur because of the high kinematic viscosity when the oil temperature is low, improving the fuel efficiency. In particular, since the EGR gas loses heat to the oil, it has an lowered temperature, thus minimizing generation of $NO_x$.

Figure 5:
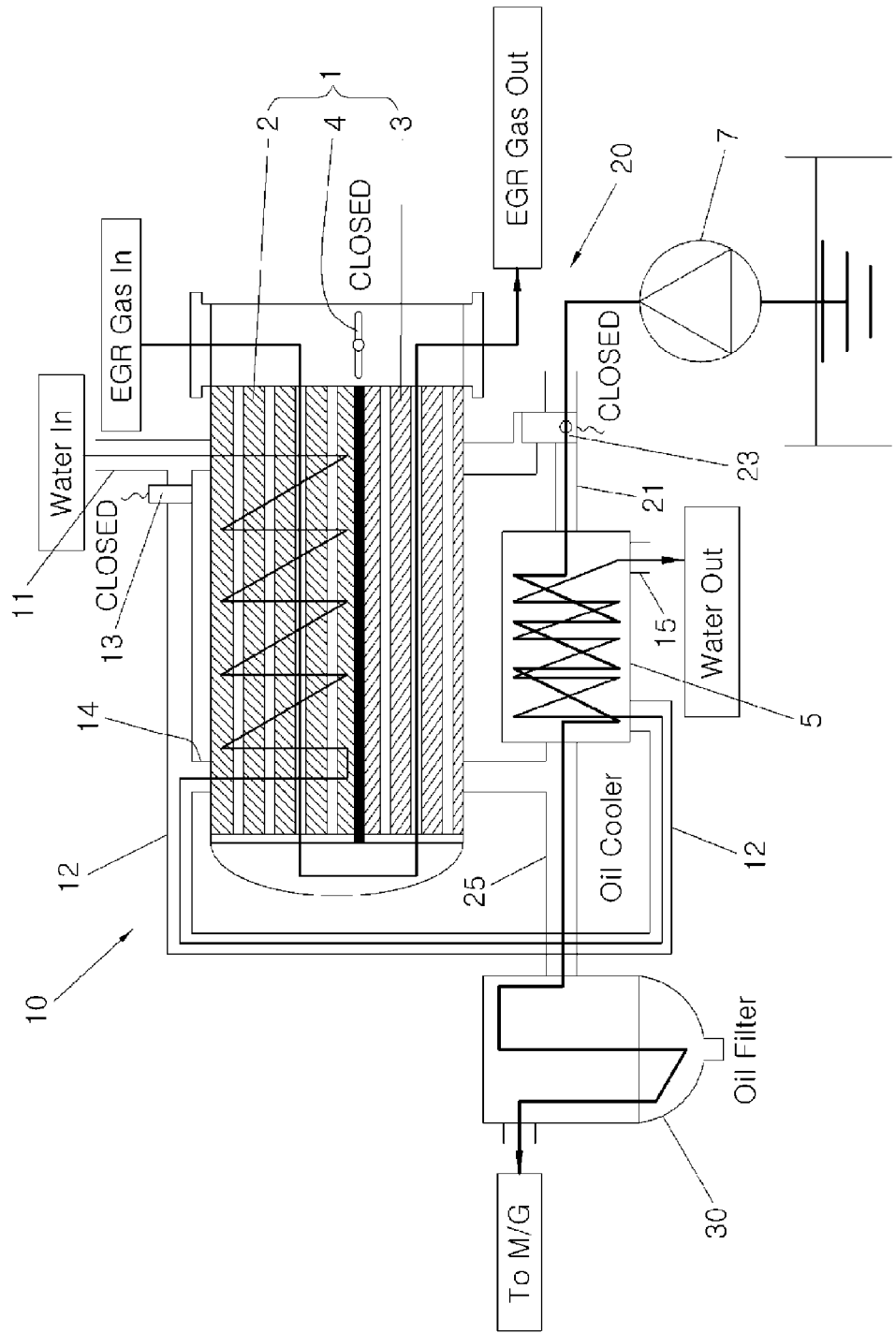
FIG. 5 is a view illustrating a full warm up operation state of an exemplary integrated cooling system for a vehicle according to the present invention.

FIG. 5 is a view illustrating an operation state at the time needed to reach warm up in an exemplary integrated cooler system for a vehicle according to various embodiments of the present invention. As shown therein, as the ECV 4 is switched to the close, the EGR gas circulates in the interior of the EGR cooler 1 and is discharged to the outside, and as the cooling water valve 13 is switched to the close, the cooling water supplied from the engine is supplied to the oil cooler 5 by way of the EGR cooler 1, and as the oil valve 23 is switched to the close, the oil supplied from the oil pump 7 is directly supplied to the oil cooler 5 by way of the oil inlet pipe 21. The above mentioned operation corresponds to H(c) of FIG. 2.

The cooling water absorbs the heat from the EGR gas while flowing by way of the cooling water circulation line 2 of the EGR cooler 1 and has an increased temperature and then passes through the cooling water connection pipe 3 connected to the outlet port and is supplied to the coil cooler 5 by way of the cooling water branch pipe 12. So, the EGR gas loses heat to the cooling water at the time when the full warm up is reached, lowering the temperature and hence generation of NO even more.

The oil can have a constantly maintained oil temperature with the aid of the cooling water which is heated by means of the heat from the EGR gas, so the lubrication state of the driving state can be maintained in the most optimized state without having friction problems occurred due to the high kinematic viscosity when the oil is at a low temperature. In addition, as the lubrication state of the engine can quickly reaches the optimized state, the noises and vibrations can be dramatically reduced.

FIG. 6 is an oil temperature diagram of an exemplary integrated cooler system according to various embodiments of the present invention. As shown therein, the warm up reach time Ta needed for the oil of the integrated cooler system to reach the target temperature Tt is faster than the warm up reach time Tb needed for the oil of the common cooler system to reach the target temperature Tt. Since the warm up of the oil is quickly obtained, the total heat of the EGR cooler 1 can be improved about 2.0 KW as compared to the conventional systems, and the total heat of the oil cooler 5 can be improved about 1.4 KW as compared to the conventional systems. These results are obtained from tests.

As described above, the integrated cooler system for a vehicle according to various embodiments of the present invention may include a cooling water line 10 configured to directly transfer the cooling water supplied from the engine cooling system to the oil cooler 2 without passing through the EGR cooler 1, depending on a warm up state of the engine which is divided into one or more stages or states, or to the oil cooler by way of the EGR cooler 1; and an oil line 20 configured to directly transfer the oil supplied from the oil pump to the oil cooler 5 without passing through the EGR cooler 1, depending on a warm up state of the engine, or to an oil filter 30 after it passes through the EGR cooler 1, the oil filter serving to filter impurities contained in the oil from the oil cooler 5, so the loss of the driving force of the water pump can be reduced due to the lowest differential pressure of the cooling water by way of the EGR cooler 1 at the time of the cold start, and in particular the time needed to warm up the oil can be shortened, which results in the optimized lubrication state of the driving system.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooler system for a vehicle, comprising:
    an Exhaust Gas Recirculation (EGR) cooler configured to selectively discharge an EGR gas through or not through an interior of the EGR cooler to an outside depending on a warm up state of an engine, wherein the EGR gas, when discharged through the interior of the EGR cooler, serving to transfer heat to selectively cooling water or oil depending on a warm up state of an engine;
    an oil cooler configured to flow oil, the oil serving to absorb heat from the cooling water which is discharged to the outside after it transfers heat to the oil;
    a cooling water line configured to selectively transfer the cooling water directly to the oil cooler without passing through the EGR cooler or to the oil cooler by way of the EGR cooler depending on the warm up state of the engine; and
    an oil line configured to selectively transfer the oil supplied from an oil pump to the oil cooler without passing through the EGR cooler or to an oil filter after passing through the EGR cooler depending on the warm up state of the engine, the oil filter serving to filter impurities contained in the oil from the oil cooler.

2. The system of claim 1, wherein:
    the warm up state of the engine is divided into an initial engine cold operation state, an engine warm up state and an engine full warm up state;
    the cooling water line is configured to directly transfer the cooling water to the oil cooler without passing through the EGR cooler in the initial engine cold operation state and the engine warm up state, and to the oil cooler through the EGR cooler in the engine full warm up state; and
    the oil line is configured to directly transfer the oil to the oil cooler without passing through the EGR cooler in the initial engine cold operation state and the engine full warm up state, and to the oil filter after passing through the EGR cooler in the engine warm up state.

3. The system of claim 1, wherein the EGR cooler comprises:
    a cooling water circulation line in which the cooling water circulates while absorbing heat from the EGR gas;
    an oil circulation line in which the oil circulates while absorbing heat from the EGR gas; and
    an Exhaust Control Valve (ECV) configured to selectively allow the EGR gas circulating the interior of the EGR cooler or discharging directly to the outside without circulating the interior of the EGR cooler.

4. The system of claim 3, wherein the cooling water circulation line and the oil circulation line each comprises a plurality of pipe lines connected with inlet ports and outlet ports and the ECV comprises an on/off valve.

5. The system of claim 1, wherein the cooling water line comprises:
    a cooling water inlet pipe connected with the EGR cooler;
    a cooling water branch pipe which is divided from the cooling water inlet pipe and provides a direct connection to the oil cooler;
    a cooling water valve installed at a divided portion of the cooling water inlet pipe;
    a cooling water connection pipe serving to transfer the cooling water from the EGR cooler to the cooling water branch pipe; and
    a cooling water discharge pipe for discharging the cooling water circulated in the oil cooler to the outside.

6. The system of claim 5, wherein the cooling water valve comprises a solenoid valve or an on/off valve.

7. The system of claim 1, wherein the oil line comprises:
    an oil inlet pipe connected with the oil cooler;
    an oil branch pipe divided from the oil inlet pipe and providing a connection to the EGR cooler;
    an oil valve installed at an divided portion of the oil inlet pipe; and
    an oil connection pipe serving to transfer the oil from the EGR cooler to the oil discharge pipe.

8. The system of claim 7, wherein the oil valve comprises a solenoid valve or an on/off valve.

9. A cooler system for a vehicle, comprising:
    an EGR cooler which comprises:
        a cooling water circulation line in which the cooling water circulates while absorbing heat from the EGR gas;
        an oil circulation line in which the oil circulates while absorbing heat from the EGR gas; and
        an Exhaust Control Valve (ECV) configured to selectively allow the EGR gas circulating the interior of the EGR cooler or discharging directly to the outside without circulating the interior of the EGR cooler;
    an oil cooler configured to flow oil, the oil serving to absorb heat from the cooling water which is discharged to the outside after it transfers heat to the oil;
    a cooling water line which comprises:
        a cooling water inlet pipe connected with the EGR cooler;
        a cooling water branch pipe which is divided from the cooling water inlet pipe and provides a direct connection to the oil cooler;
        a cooling water valve installed at a divided portion of the cooling water inlet pipe for forming a direct connection to the oil cooler;
        a cooling water connection pipe serving to transfer the cooling water from the EGR cooler to the cooling water branch pipe; and
        a cooling water discharge pipe for discharging the cooling water circulated in the oil cooler to the outside; and
    an oil line which comprises:
        an oil inlet pipe connected with the oil cooler;
        an oil branch pipe divided from the oil inlet pipe and providing a connection to the EGR cooler;
        an oil valve installed at an divided portion of the oil inlet pipe; and
        an oil connection pipe serving to transfer the oil from the EGR cooler to the oil discharge pipe.

10. The system of claim 9, wherein:
the warm up state of the engine is divided into an initial engine cold operation state, an engine warm up state and an engine full warm up state;
the ECV is configured to directly transfer the EGR gas to the outside without the circulation in the interior of the EGR cooler in the initial engine cold operation state as it is switched to the open, whereas the EGR gas is discharged to the outside after it circulates in the interior in the engine warm up state and the engine full warm up state as it is switched to the close;
the cooling water valve is configured to directly transfer the cooling water to the oil cooler without passing through the EGR cooler in the initial engine cold operation state and the engine warm up state as it is switched to the open, whereas the cooling water is transferred to the oil cooler after it passes through the EGR cooler in the engine full warm up state as it is switched to the close; and
the oil valve is configured to directly transfer the oil to the oil cooler without passing through the EGR cooler in the initial engine cold operation state and the engine full warm up state as it is switched to the close, whereas the oil is transferred to the oil filter after it passes through the EGR cooler in the engine warm up state as it is switched to the open.

11. The system of claim 10, wherein the ECV comprises an on/off valve, and the cooling water valve and the oil valve comprise solenoid valves or on/off valves.

* * * * *